United States Patent [19]

Gondo

[11] Patent Number: 5,800,008
[45] Date of Patent: Sep. 1, 1998

[54] VEHICLE BODY UPPER STRUCTURE OF AUTOMOBILE

[75] Inventor: Kenji Gondo, Toyota, Japan

[73] Assignee: Toyota Jidosha Kabushiki Kaisha, Toyota, Japan

[21] Appl. No.: 741,222

[22] Filed: Oct. 29, 1996

[30] Foreign Application Priority Data

Nov. 1, 1995 [JP] Japan ................. 7-306395

[51] Int. Cl.$^6$ ............................................. B60R 27/00
[52] U.S. Cl. ............................. 296/189; 280/150 B
[58] Field of Search ..................... 296/189; 280/150 B, 280/751

[56] References Cited

U.S. PATENT DOCUMENTS

| | | | |
|---|---|---|---|
| 3,779,595 | 12/1973 | Suzuki et al. | 296/189 |
| 5,163,730 | 11/1992 | Welch | 296/189 |
| 5,382,051 | 1/1995 | Glance | 296/189 |
| 5,560,672 | 10/1996 | Lim et al. | 296/189 |

FOREIGN PATENT DOCUMENTS

| | | |
|---|---|---|
| 6-211161 | 8/1994 | Japan. |
| 7-246953 | 9/1995 | Japan. |
| 7-285394 | 10/1995 | Japan. |

*Primary Examiner*—Jesus D. Sotelo
*Attorney, Agent, or Firm*—Cushman Darby & Cushman IP Group of Pillsbury Madison & Sutro, LLP

[57] ABSTRACT

A vehicle body upper structure of an automobile provided with a roofside rail (20) including an outer panel (22), a reinforcing panel (24) and an inner panel (26) and formed as a closed sectional structure by joining flange portions facing each other is disclosed. The inner panel (26) is formed by a steel plate having a smaller thickness than the thickness of the outer panel and the thickness of the reinforcing panel and is deformable when a predetermined or more load is applied. The inner panel has integrally a rising portion (28, 29) rising respectively inward from of a pair of flange portions (27A, 27B) and an inward portion (30) coupling the inward ends of these rising portions. The rising portion (29) is formed so as to buckle when a predetermined or more load is applied.

9 Claims, 5 Drawing Sheets

VEHICLE BODY UPPER STRUCTURE OF AUTOMOBILE

BACKGROUND OF THE INVENTION

1. Field of the Invention

The present invention relates to a vehicle body upper structure of an automobile, and more particularly, to a vehicle body upper structure suitable for a passenger car.

2. Description of the Related Art

As shown in FIG. 6(a), there is proposed a vehicle body upper structure of an automobile for protecting a passenger in the vehicle body upper portion having a structural member, comprising an outer panel 10, a reinforcing panel 11 disposed with a space from the outer panel 10 inward thereof and an inner panel 12 disposed with a space from the reinforcing panel 11 inward thereof, and formed as a closed sectional structure by joining flange portions of these panels facing each other, the thickness of the inner panel 12 being set to be smaller than the thickness of the outer panel 10 and that of the reinforcing panel 11, whereby the inner panel 12 is used as an energy absorbing panel (Japanese Patent Appln. Public Disclosure No. 7-246953).

The inner panel 12 has rising portions 15, 16 rising inwardly from a pair of flange portions 13, 14, and an inward portion 17 for connecting integrally the inward ends of the rising portions 15, 16. When a head form 18 simulated to the head portion of a passenger collides with the inner panel 12 which is an energy absorbing panel, the inward portion 17 is first plastically deformed as shown in FIG. 6(b), and then the two rising portions 15, 16 are buckled, thereby absorbing the energy.

SUMMARY OF THE INVENTION

When an energy is absorbed by buckling two rising portions, the peak load at the time of buckling of the two rising portions tends to show conspicuously. It is possible to decrease the peak load by making thin the thickness of the inner panel which is the energy absorbing panel. However, by so doing, a so-called rising load at the time of the initial plastic deformation becomes small and deviates from a preferred energy absorbing characteristic. Thus, since there is a restriction to making the thickness of the inner panel thin, there is also a restriction to decreasing the peak load.

Next, since it is intended that the amount of total energy absorption by buckling the two rising portions is within a predetermined range, if the shapes and the dimensions of the two rising portions are changed, the amount of total energy absorption varies, so that it becomes impossible to sufficiently achieve a primary function. Consequently, the amount of total energy absorption may vary if the shapes or the dimensions of the two rising portions are forced to be changed as in case of providing the inner panel with a seat portion for mounting an assist grip or a sunroof bracket.

The present invention provides a vehicle body upper structure of an automobile capable of absorbing collision energy only by means of an energy absorbing panel without providing another energy absorbing material such as urethane foam.

The present invention further provides a vehicle body upper structure of an automobile capable of decreasing a peak load of an energy absorbing panel.

The present invention further provides a vehicle body upper structure of an automobile capable of restraining substantial changes in the amount of energy absorption in mounting an assist grip, a sunroof bracket and other parts on the inner panel.

The present invention relates to a vehicle body upper structure having a structural member comprising an outer panel having a pair of flange portions, a reinforcing panel having a pair of flange portions disposed with a space from the outer panel inward thereof, and an inner panel having a pair of flange portions disposed with a space from the reinforcing panel inward thereof, the structural member being formed as a closed sectional structure by joining the mutually facing flange portions. The inner panel is composed of a metal plate, preferably a steel plate having a thickness thinner than the thickness of the outer panel and the thickness of the reinforcing panel and can be deformed when a predetermined or more load is applied. The inner panel includes integrally rising portions rising respectively inward from the pair of flange portions of the inner panel, and an inward portion coupling the inward ends of the rising portions. The pair of rising portions are formed such that one of the pair of rising portions would be buckled when a predetermined or more load is applied to the inward portion.

The structural member may be a roofside rail or a pillar, and is preferably a roofside rail extending longitudinally of the vehicle body. In this case, one of the rising portions to be buckled rises to stand erect from the flange portion disposed outwardly of the width direction of the vehicle body, while the other of the pair of rising portions rises with an obtuse inclination from the flange portion disposed inwardly of the width direction of the vehicle body. Here, "rises to stand erect" means that the rising portion intersects the flange portion orthogonally, or at nearly right angles, and the angle can be determined within the range where the rising portion is buckled due to a predetermined or more collision load.

In case the structural member is a roofside rail and the other of the rising portions rises with an obtuse inclination from the flange portion, the inward portion of the inner panel or the other of the rising portions can be formed to include a seat portion for mounting other parts. In such a case, the seat portion has a weld nut for mounting the other parts on the outside surface of the inner panel, and the reinforcing panel has a non-meddling portion in a portion opposing to the weld nut.

The structural member having the inner panel is installed on the vehicle body upper portion so that one of the pair of rising portions may have a load source like a passenger's head portion in its substantial extending direction and so that the other of the pair of rising portions may face the load source. When a predetermined or more collision load is applied to the inner panel from the load source, mainly the inward portion of the inner panel or the inward portion and the other of the rising portions are plastically deformed. When the load increases, one of the rising portions is buckled. Thereby, the collision energy is absorbed.

The inner panel of the structural member can absorb collision energy without providing another energy absorbing material such as urethane foam, while improving the rigidity of the structural member. As a result, the effective and economical energy absorbing structure can be obtained.

Since it is only one of the rising portions that is buckled, the peak load when the inner panel is sufficiently deformed can be decreased. In such a case, it is confirmed by the inventors that, even when the shapes and the dimensions of the inward portion and/or the other of the rising portions are changed without changing the shape and the dimension of the one of rising portions, the characteristic of energy absorption does not change substantially. Consequently, without any influence on the characteristic of energy absorption, the inward portion of the inner panel or the other of the rising portions can be used as a seat portion for mounting other parts.

In case the other of the rising portions of the inner panel of the roofside rail rises with an obtuse inclination from the flange portion disposed inwardly of the width direction of the vehicle body, the clearance between the rising portion and the passenger's head can be made large.

In case the seat portion of the other of the rising portions of the inner panel has a weld nut for mounting other parts on the outside surface of the inner panel, and the reinforcing panel has the non-meddling portion in the portion opposite to the weld nut, no interference occurs between the weld nut and the reinforcing panel when the other of the rising portions is plastically deformed, and the other of the rising portions can be deformed just as intended at the beginning.

DESCRIPTION OF THE PREFERRED EMBODIMENTS

Figure 1:
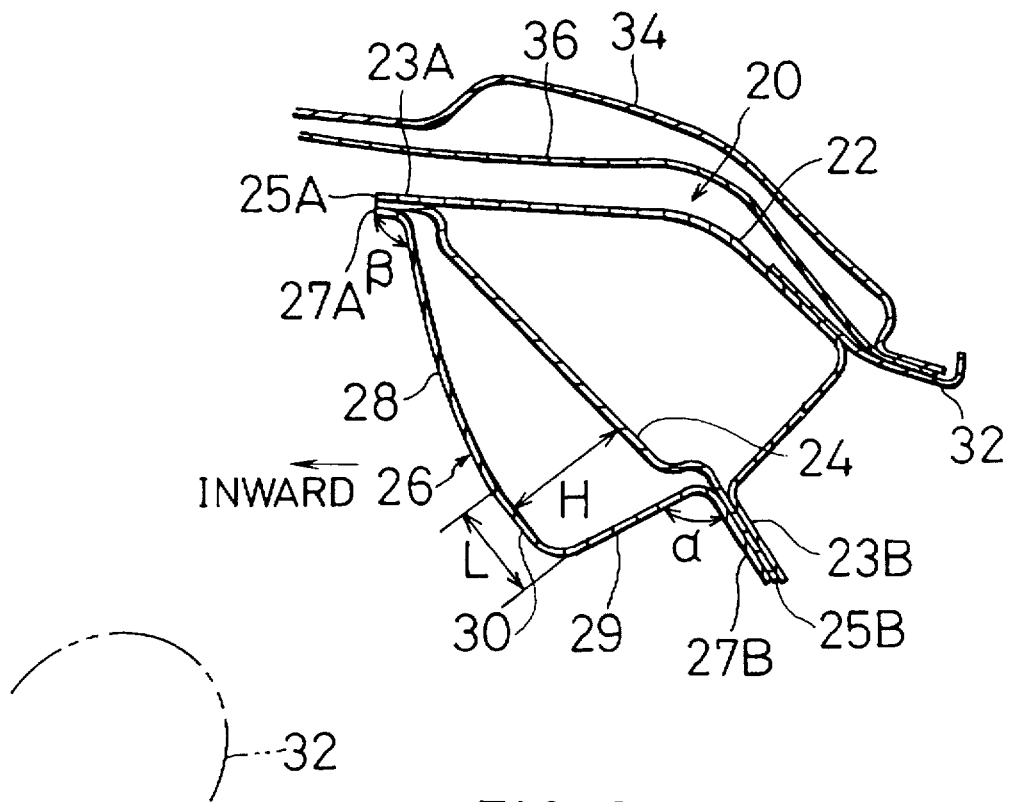
FIG. 1 is a sectional view cut off at a vertical plane of an embodiment of the vehicle body upper structure of an automobile relative to the present invention.

Referring to FIG. I showing a first embodiment by a section, the vehicle body upper structure of an automobile includes a roofside rail 20 extending perpendicularly to a plane of the drawing, i.e., longitudinally of the vehicle body. The roofside rail 20 includes: an outer panel 22 having a pair of flange portions 23A, 23B; a reinforcing panel 24 disposed with a space from the outer panel 22 inward thereof and having a pair of flange portions 25A, 25B; and an inner panel 26 disposed with a space from the reinforcing panel 24 inward thereof and having a pair of flange portions 27A, 27B. The roofside rail 20 is formed by spot-welding and connecting the mutually facing flange portions 23A, 25A, 27A and flange portions 23B, 25B, 27B such that a section cut off at a vertical plane presents a closed structure.

The inner panel 26 is formed by a steel plate having a thickness thinner than the thickness of the outer panel 22 and the thickness of the reinforcing panel 24 and is deformable when a predetermined or more load is applied. The inner panel 26 has integrally a rising portion 28 rising from the flange portion 27A of the inner panel 26, a rising portion 29 rising from the flange portion 27B inwardly, and an inward portion 30 coupling the inward ends of these rising portions 28, 29. The pair of rising portions 28, 29 are formed such that one of the pair of rising portions would be buckled when a predetermined or more load is applied to the inward portion 30.

In the illustrated embodiment, the rising portion 28 is positioned to face a passenger's head portion 32, while the rising portion 29 is positioned such that the head portion 32 comes in its substantial extending direction. There, the rising portion 29 rises to stand erect from the flange portion 27B so that the rising portion 29 may be buckled by a collision load. In this embodiment, the rising angle $\alpha$ of the rising portion 29 from the flange portion 27B is about 95°. It is necessary for the rising portion 29 to rise to such an extent as an energy absorbing space H can be ensured between the inward portion 30 and the reinforcing panel 24. The energy absorbing space H can be set within the range of 15–30 mm.

The predetermined energy absorbing space H determines an amount of displacement for enabling an energy absorption, and the rising angle $\alpha$ by which the amount of buckling the rising portion 29 by a collision load is effected relates to the size of an absorbable load, both influencing the energy absorption characteristic. These are determined by the shape and the dimension of the rising portion 29, but are not related to the rising angle $\beta$ of the rising portion 28 from the flange portion 27A and a distance L of the inward portion 30 between the rising portions 28, 29 within the closed section. As mentioned later, however, when the rising angle $\beta$ of the rising portion 28 becomes a certain angle relative to the load source 32, the rising portion 28 tends to be buckled, and the energy absorption characteristic varies. So, the rising angle $\beta$ of the rising portion 28 and the distance L of the inward portion 30 can be arbitrarily set within a range where the rising portion 28 is not buckled. Thus, the degree of freedom in selecting the shapes of the rising portion 28 and the inward portion 30 is high. In the illustrated embodiment, the rising portion 28 rises from the flange portion 27A with an obtuse inclination.

The roofside rail 20 is put to use by connecting a drip channel 32 to the roofside rail 20 and connecting a roof outer panel 34 and a roof inner panel 36 to the drip channel 32.

Figure 2:
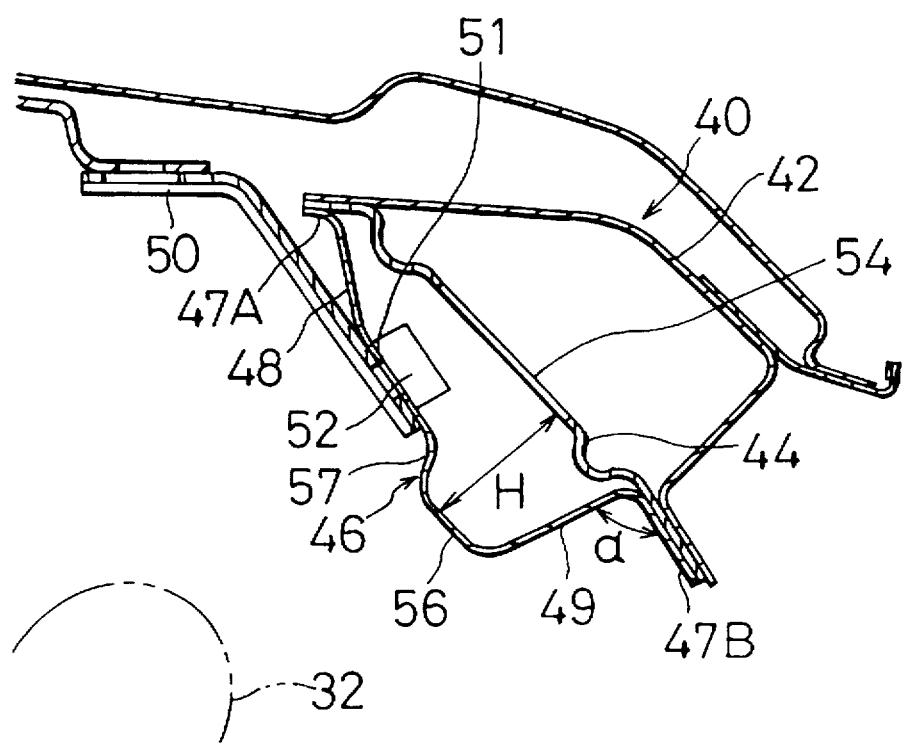
FIG. 2 is a sectional view cut off at a vertical plane of another embodiment of the vehicle body upper structure of an automobile relative to the present invention.
Figure 3:
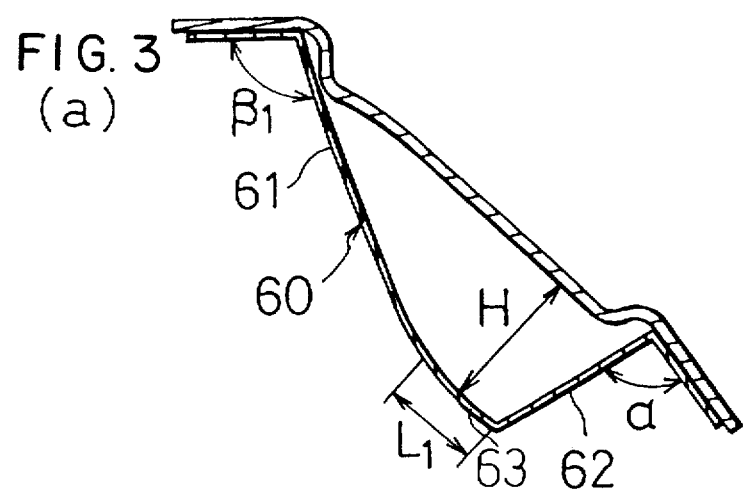
FIG. 3(a)–3(e) schematically shows the function and effect of the present invention, in which 3(a) is a sectional view of an inner panel; 3(b) through 3(d) show states of deformations of the inner panel by the head form in correspondence with different displacements; 3(e) is a view showing load-to-displacement characteristics, i.e., a view showing characteristics of energy absorption, where the black circles b through d correspond to 3(b) through 3(d).
Figure 3:
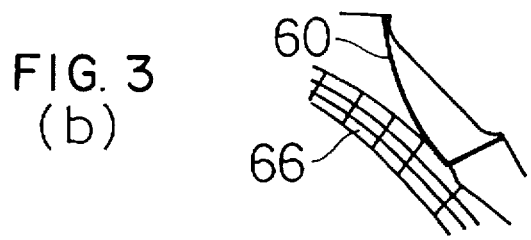
Figure 3:
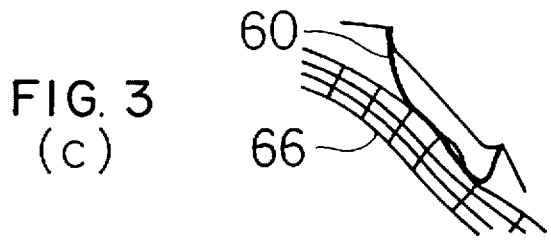
Figure 3:
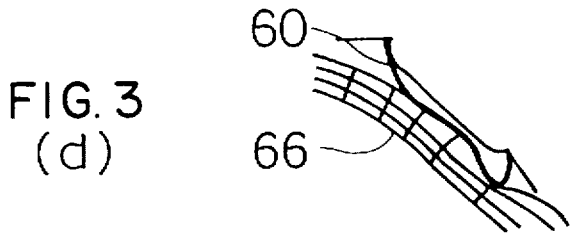
Figure 3:
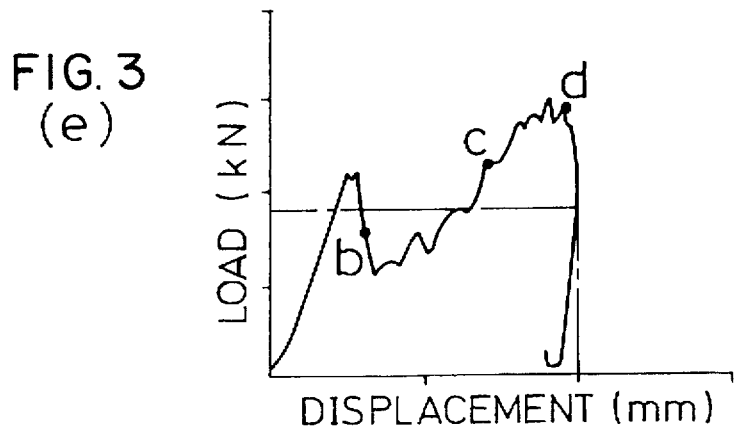
Figure 4A:
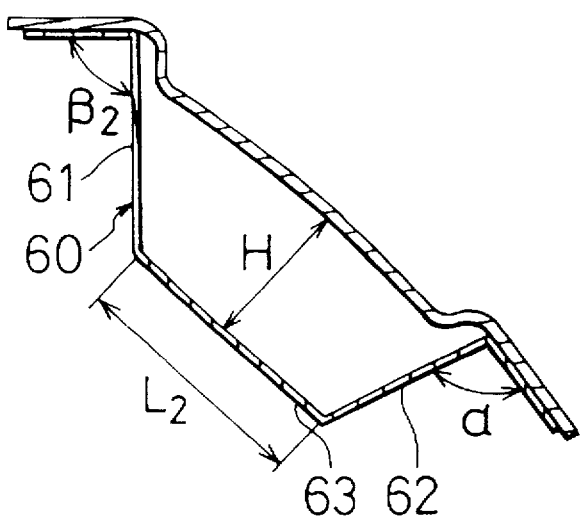
FIG. 4(a)–4(e) schematically shows the function and effect of the present invention, in which 4(a) is a sectional view of the inner panel; 4(b) through 4(d) show states of deformation of the inner panel by the head form in correspondence with different displacements; 4(e) is a view showing load-to-displacement characteristics, i.e., a view showing characteristics of energy absorption, where the black circles b through d correspond to 4(b) through 4(d).
Figure 4B:
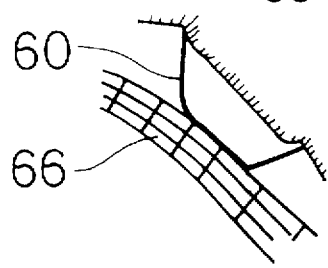
Figure 4C:
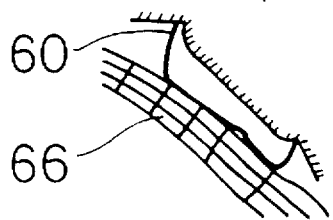
Figure 4D:
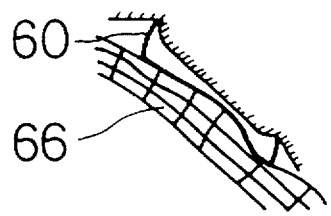
Figure 4E:
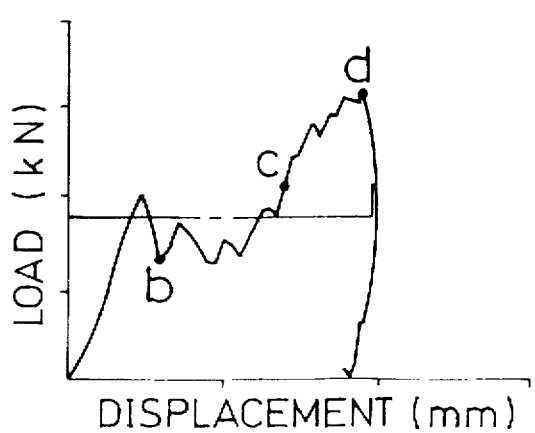
Figure 5:
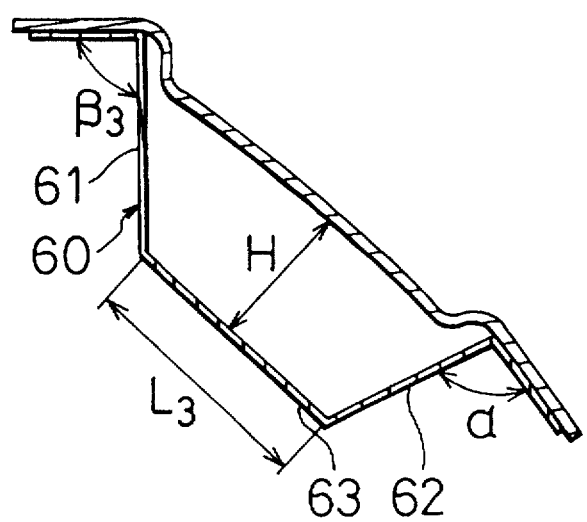
FIG. 5(a)–5(e) schematically shows the function and effect of the present invention, in which 5(a) is a sectional view of the inner panel; 5(b) through 5(d) show states of deformation of the inner panel by the head form in correspondence with different displacements; 5(e) is a view showing load-to-displacement characteristics, i.e., a view showing characteristics of energy absorption, where the black circles b through d correspond to 5(b) through 5(d).
Figure 5:
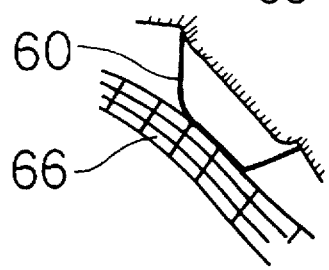
Figure 5:
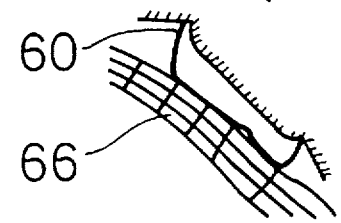
Figure 5:
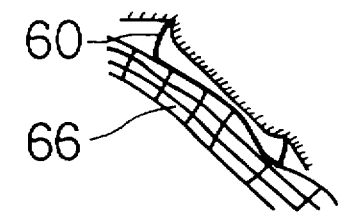
Figure 5:
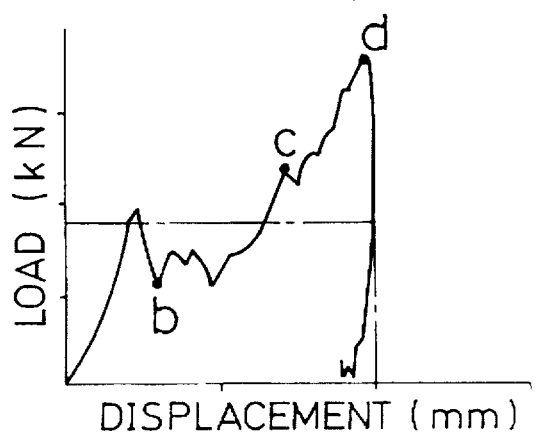
Figure 6A:
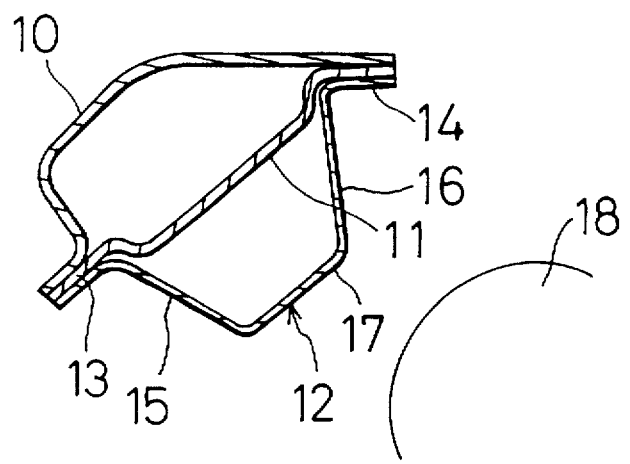
FIG. 6(a) and 6(b) shows a conventional art, in which 6(a) is a sectional view of the inner panel before deformation and 6(b) is a sectional view thereof after deformation.
Figure 6B:
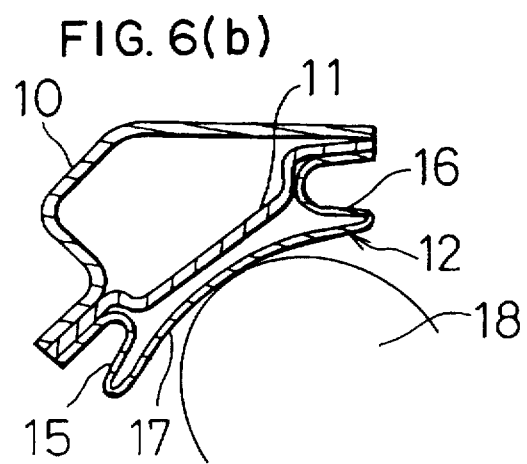

Referring to FIG. 2 showing a section of a second embodiment, it is the same as the embodiment shown in FIG. 1 in that a roofside rail 40 is formed by an outer panel 42, a reinforcing panel 44 disposed with a space from the outer panel 42 inwardly thereof, and an inner panel 46 disposed with a space from the reinforcing panel 44 inward thereof, and that the mutually facing flange portions are connected by spot-welding such that a section cut off at a vertical plane presents a closed structure. Also, it is the same in that the inner panel 46 is formed by a steel plate having a thickness thinner than the thickness of the outer panel 42 and the thickness of the reinforcing panel 44 and is deformable when a predetermined or more load is applied.

In this embodiment, of the two rising portions 48, 49 of the inner panel 46, the rising portion 48 rises from the inward flange portion 47A with an obtuse inclination, and a part thereof is formed as a seat portion 51 of a sunroof bracket 50. The inside surface of the seat portion 51 is formed as a flat plane in close contact with the sunroof bracket 50, and on the outside surface of the seat portion 51 a weld nut 52 is welded for mounting the sunroof bracket 50. On the other hand, the reinforcing panel 44 has a non-meddling portion 54 in a portion opposite to the weld nut 52. While the non-meddling portion 54 is a through hole in the illustrated embodiment, it may be a recess enough for accommodating the weld nut 52 and concaved outwardly.

The rising portion 49 of the inner panel 46 rises to stand erect from the flange portion 47B with a rising angle α, ensuring the energy absorbing space H between the inward portion 56 and the reinforcing panel 44. The seat portion 51 is connected to the inward portion 56 through a shoulder portion 57 so that the sunroof bracket 50 would not interfere with an interior trim material (not shown) disposed inwardly of the inner panel 46 when the sunroof bracket 50 is bolted at the seat portion 51. For this purpose, the rising portion 48 of the inner panel 46 shown in FIG. 2 has a complicated shape in comparison with the rising portion 28 shown in FIG. 1. However, as far as they have the same energy absorbing space H and rising angle α of the rising portion 49, no substantial variation in the energy absorbing characteristic is caused.

In the roofside rail 20 shown in FIG. 1, when a predetermined or more collision load is applied from the load source 32 to the inner panel 26, mainly the inward portion 30 of the inner panel or the inward portion 30 and the rising portion 28 are plastically deformed. When the load becomes greater, the rising portion 29 is buckled. Thereby, the collision energy is absorbed. Likewise in the roofside rail 40 shown in FIG. 2, when a predetermined or more collision load is applied from the load source 32 to the inner panel 46, mainly the inward portion 56 of the inner panel or the inward portion 56 and the rising portion 48 are plastically buckled. With this plastic deformation, when the weld nut 52 approaches the reinforcing panel 44, the weld nut 52 escapes into the non-meddling portion 54, so that it can be sufficiently plastically deformed. When the load becomes greater, the rising portion 49 is buckled. Thereby, the collision energy is absorbed.

Next, the function and effect of the vehicle body upper structure of an automobile relative to the present invention are explained on the basis of FIGS. 3(a) through 5(e). In an inner panel 60 shown in 3(a), 4(a) and 5(a) of FIGS. 3(a) through 5(e) respectively, the thickness of the plate is 0.7 mm, the rising angle α of a rising portion 62 is 95° and the energy absorbing space H is 20 mm. In FIG. 3(a)-3(e) the rising angle $\beta_1$ of a rising portion 61 was 106°, the distance $L_1$ of an inward portion 63 was 13 mm; in FIG. 4(a)-4(e) the rising angle $\beta_2$ of the rising portion 61 was 97°, the distance $L_2$ of the inward portion 63 was 28 mm; in FIGS. 5(a)-5(e) the rising angle $\beta_3$ of the rising portion 61 was 91°, the distance $L_3$ of the inward portion 63 was 32 mm. In FIGS. 3(a) through 5(e), 3(b), 3(c), 3(d), 4(b), 4(c), 4(d), 5(b), 5(c) and 5(d) show the states where the head form 66 collided with the inner panel 60 and the inner panel 60 was deformed. Also, in FIGS. 3(a) through 5(e), the black circles b, c, d show the relation between the load and the displacement when the inner panel 60 was deformed like 3(b), 3(c), 3(d), 4(b), 4(c), 4(d), 5(b), 5(c) and 5(d).

Referring to 3(e), 4(e) and 5(e) of FIGS. 3(a) through 5(e), there is no substantial difference in the load-to-displacement characteristic at the points b and c in FIGS. 3(a) through 5(e). This shows that, in the state where the inward portion 63 of the inner panel 60 or the inward portion 63 and the rising portion 61 are plastically deformed, the load-to-displacement characteristic does not substantially change even when the distance L of the inward portion 63 and the rising angle β of the rising portion 61 change. On the contrary, point d is higher in FIGS. 4(a)-4(e) than in FIGS. 3(a)-3(e), and higher in FIGS. 5(a)-5(e) than in FIGS. 4(a)-4(e). This shows that, as the rising angle β becomes smaller, the rising portion 61 tends to be buckled and the load becomes higher. By comparing the states of deformation shown in 3(d), 4(d) and 5(d) of respective figures, it is understood that the rising portion 61 is buckled in FIGS. 5(a)-5(e). Also, from the general characteristics in FIGS. 3(a) and 4(e), it is understood that, unless the rising portion 61 does not buckle, there is no substantial influence upon the energy absorption characteristic even if the rising angle β of the rising portion 61 and the distance L of the inward portion 63 change. Further, in the illustrated roofside rail, it is understood that the energy absorption characteristic in FIG. 3(a)-3(e) where the rising angle β of the rising portion 61 is the greatest is the closest to a rectangular state which is considered ideal.

What I claim is:

1. A vehicle body upper structure of an automobile provided with a structural member comprising:

an outer panel having a pair of flange portions;

a reinforcing panel disposed with a space from the outer panel inward thereof and having a pair of flange portions; and an inner panel spaced from the reinforcing panel inward thereof and having a pair of flange portions, said structural member being formed as a closed sectional structure by joining said flange portions facing each other, wherein said inner panel is formed by a metal plate having a smaller thickness than that of said outer panel and the thickness of said reinforcing panel, and is deformable when a predetermined or more load is applied, said inner panel having integrally a rising portion rising from each of flange portion of said inner panel and an inward portion for coupling the inward ends of said rising portions, and said pair of rising portions is formed so that one of said pair of rising portions may buckle when a predetermined or more load is applied to said inward portion, and wherein said structural member is a roofside rail extending longitudinally of said vehicle body, and wherein said one of said pair of rising portions rises to stand substantially erect from said flange portion of said inner panel disposed outwardly of the width direction of said vehicle body, and wherein the other of said pair of rising portions rises with a rising angle from said flange portion of said inner panel disposed inwardly of the width direction of said vehicle body, and wherein said rising angle and the distance of said inward portion between the rising portions within the closed section are set within a range where said other of said pair of rising portions is not buckled.

2. A vehicle body upper structure of an automobile as described in claim 1, wherein said range is selected such that said distance of said inward portion becomes smaller as said rising angle becomes larger within an obtuse angle.

3. A vehicle body upper structure of an automobile as described in claim 1, wherein said other of said pair of rising portions rises with an obtuse inclination.

4. A vehicle body upper structure of an automobile as described in claim 1, wherein said one of said pair of rising portions rises to such an extent as an energy absorbing space is ensured between said inward portion of said inner panel and said reinforcing panel and said energy absorbing space is set within the range of 15–30 mm.

5. A vehicle body upper structure of an automobile as described in claim 1, wherein one of said inward portion of said inner panel and said other rising portion of said inner panel includes a seat portion for mounting other parts, said seat portion having a weld nut for mounting said other parts on the outside surface of said inner panel, and said reinforcing panel has a non-meddling portion opposing to said weld nut.

6. A vehicle body upper structure of an automobile as described in claims 5, wherein said other part is a sunroof bracket.

7. A vehicle body upper structure of an automobile as described in claim 5, wherein said non-meddling portion is a hole provided in said reinforcing panel.

8. A vehicle body upper structure of an automobile provided with a structural member comprising:

an outer panel having a pair of flange portions;

a reinforcing panel disposed with a space from the outer panel inward thereof and having a pair of flange portions; and an inner panel disposed with a space from the reinforcing panel inward thereof and having a pair of flange portions, said structural member being formed as a closed sectional structure by joining said flange portions facing each other, wherein said inner panel is formed by a metal plate having a smaller thickness than the thickness of said outer panel and the thickness of said reinforcing panel, and is deformable when a predetermined or more load is applied, said inner panel having integrally a rising portion rising from each of said pair of flange portions of said inner panel and an inward portion for coupling the inward ends of said rising portions, one of said pair of rising portions rising to stand substantially erect from one of said flange portions of said inner panel and the other of said pair of rising portions rising with an obtuse inclination from the other of said flange portions of said inner panel.

9. A vehicle body upper structure of an automobile as described in claim 8, wherein said structural member is a roofside rail, and wherein said rising portion standing substantially erect rises from the flange portion disposed outwardly of the width direction of said vehicle body and said rising portion with an obtuse inclination rises from the flange portion disposed inwardly of the width direction of said vehicle body.

* * * * *